United States Patent
Pei

(10) Patent No.: US 8,319,935 B2
(45) Date of Patent: Nov. 27, 2012

(54) ELECTRONIC EQUIPMENT HAVING HEAT-DISSIPATING DEVICE AND METHOD

(75) Inventor: Ting-Hang Pei, Taichung (TW)

(73) Assignee: Hannstar Display Corp., Taipei (TW)

( * ) Notice: Subject to any disclaimer, the term of this patent is extended or adjusted under 35 U.S.C. 154(b) by 585 days.

(21) Appl. No.: 12/565,709

(22) Filed: Sep. 23, 2009

(65) Prior Publication Data

US 2010/0289998 A1     Nov. 18, 2010

(30) Foreign Application Priority Data

May 14, 2009  (TW) .............................. 98208361 U

(51) Int. Cl.
*G02F 1/1333*     (2006.01)
*H05K 7/20*      (2006.01)

(52) U.S. Cl. .................... 349/161; 361/679.46; 361/694

(58) Field of Classification Search .................. 349/161; 361/694, 679.46; 381/397; 348/748
See application file for complete search history.

(56) References Cited

U.S. PATENT DOCUMENTS

2005/0105012 A1* 5/2005 Kim et al. ....................... 349/58
2009/0224245 A1* 9/2009 Umezaki ......................... 257/59

FOREIGN PATENT DOCUMENTS

WO  WO 2008053435 A1 *  5/2008
WO  WO 2008117211 A1 * 10/2008

* cited by examiner

*Primary Examiner* — Michael Caley
(74) *Attorney, Agent, or Firm* — Huffman Law Group, P.C.

(57) ABSTRACT

An embodiment of the present invention provides a heat-dissipating device of electronic equipment that comprises a housing, a heat source, a speaker, and a vibration film arranged inside the housing. The vibration film will vibrate when receiving the energy transmitted from the speaker, resulting in that the heat convection is accelerated and the heat generated by the heat source is removed.

20 Claims, 3 Drawing Sheets the rear of the speaker ←—————→ the front of the speaker

ELECTRONIC EQUIPMENT HAVING HEAT-DISSIPATING DEVICE AND METHOD

FIELD OF THE INVENTION

The present invention relates to electronic equipment, more particularly, to an electronic equipment having heat-dissipating device and method.

DESCRIPTION OF THE PRIOR ART

In a Liquid Crystal Display (LCD), a backlight is necessary for providing light to its display panel. The conventional backlight comprises a back cover, a plurality of light sources such as Cold Cathode Fluorescent Lamp (CCFL) or Light Emitting Diode (LED) arranged on the back cover, and a reflector arranged between the back cover and the light sources.

The heat dissipation of the backlight is an important issue. In the field of Liquid Crystal Display, the size of the display panel has been getting bigger and bigger. The greater is the size of the display panel, the greater is the number of the light sources, and therefore the greater is the heat generated by the light sources. The heat generated by the heat source must be dissipated; otherwise some problems will be encountered. The experiences show that about 75% of the inputted electricity power will generate heat when the backlight employs the Light Emitting Diodes as the light sources. For meeting the requirement of the design illumination, the inputted electricity power of the Light Emitting Diodes is designed at high level, and thus the unwanted high temperature is also accompanied. For example, the power consumption is high to 200 W in a 70-inch Liquid Crystal Television sold by Sony Company at 2007, in which 450 Light Emitting Diodes are employed as the light sources. The high temperature shifts the wavelength and weakens the illumination of the emitting light. When the temperature of the back cover that supports the light sources is additionally increased about 25° C., the illumination of the red LED is decreased about 12%, and the blue and green LED are decreased about 2-3%. Therefore, for Liquid Crystal Display, especially for large size Liquid Crystal Display, the heat dissipation still is a problem must be overcome when designing the backlight and the electronic system.

Typically the Liquid Crystal Display comprises a heat-dissipating device (or structure) inside the backlight, and generally the principles of the heat-dissipating device or structure comprise nature convection, force convection, and radiation. FIG. 1 shows a backlight, which is disclosed by a Taiwan Patent, published no. 200632461, entitled "backlight," wherein the backlight comprises a heat-dissipating channel. This heat-dissipating structure has disadvantage that after the Liquid Crystal Panel has been operating a period of time, the heat transfer efficiency will be gradually decayed as a result of the temperature of the air near to the outlet of the heat-dissipating channel approximating to the temperature inside the backlight. Hence this type of Liquid Crystal Display is preferably operated at an environment having good natural convection; otherwise the heat transfer efficiency will be decreased. However, if the number of the light sources is too large, for example, a large number of Light Emitting Diodes, or, if the Liquid Crystal Display is operated at summer or at a tropic country or at a closing room, the heat transfer efficiency will be decreased.

In addition, an American patent application, published no. 20070291451, entitled "Electronic Equipment Including an Apparatus for Cooling Interior of Housing" discloses an electronic equipment that comprises a fan for blowing the heat out through a plurality of holes. A Taiwan patent, published no. 200630685, entitled "Liquid Crystal Display and Interior Temperature Adjusting Method Thereof," discloses a Liquid Crystal Display that comprises a backlight and a heat-dissipating device. The heat-dissipating device comprises a fan, a temperature sensor, and a fan controller. The fan controller controls the fan according to the interior temperature measured by the temperature sensor. Although the above two inventions can increase the heat transfer efficiency, the electronic system of the Liquid Crystal Display has been complicated, and an additional electricity power must be provided to the fan, thus exhausting more energy.

Therefore, it would be advantageous to provide an electronic apparatus having a novel heat-dissipating device or method for improving the heat transfer efficiency of electronic equipment on condition that the electronic system of the electronic equipment will not be complicated and energy-saving and ejection-decreasing principles can be met.

SUMMARY OF THE INVENTION

The object of the present invention is to provide an electronic equipment having a heat-dissipating device and method for improving the heat transfer efficiency inside the electronic equipment on condition that the electronic system of the electronic equipment will not be complicated and energy-saving and ejection-decreasing principles can be met.

According to the object, one embodiment of the present invention provides an electronic equipment having a heat-dissipating device, the electronic equipment comprising a housing, a heat source generating heat, a speaker, and at least one vibration component arranged inside the housing, wherein the vibration component receives sound energy emitted by the speaker, causing the vibration component vibrating, thereby speeding up the heat convection and driving out the heat.

According to the object, one embodiment of the present invention provides a heat-dissipating method of an electronic equipment, the electronic equipment comprising a housing, a heat source generating heat, and at least one speaker, the method comprising: arranging at least one vibration film or vibration blade inside the housing; and speeding up the heat convection by altering the air density inside the housing as a result of the vibration of the vibration film or the vibration blade, wherein the vibration film or the vibration blade receives energy transmitted from the speaker and thus causing the vibration.

According to the object, one embodiment of the present invention provides a heat-dissipating device applied to a Liquid Crystal Display, which comprises a backlight comprising a plurality of light sources, a display panel, at least one speaker, and at least one vibration film or at least one vibration blade arranged inside the backlight, wherein the vibration film or the vibration blade receives sound energy emitted by the speaker, causing the vibration film or the vibration blade vibrating, thereby speeding up the heat convection and driving out the heat of the light sources.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations and components are not been described in detail in order not to unnecessarily obscure the present invention. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts.

The present invention will provide an electronic equipment having a heat-dissipating device or method for improving the heat transfer efficiency of the electronic equipment on condition that the electronic system will not be complicated and energy-saving and ejection-decreasing principles can be met. Typically an electronic equipment, such as a Liquid Crystal Display, has a pair of speakers, and the inventive concept of the present invention is to employ the energy provided by the speaker to dissipate heat generated by a heat source.

Figure 1:
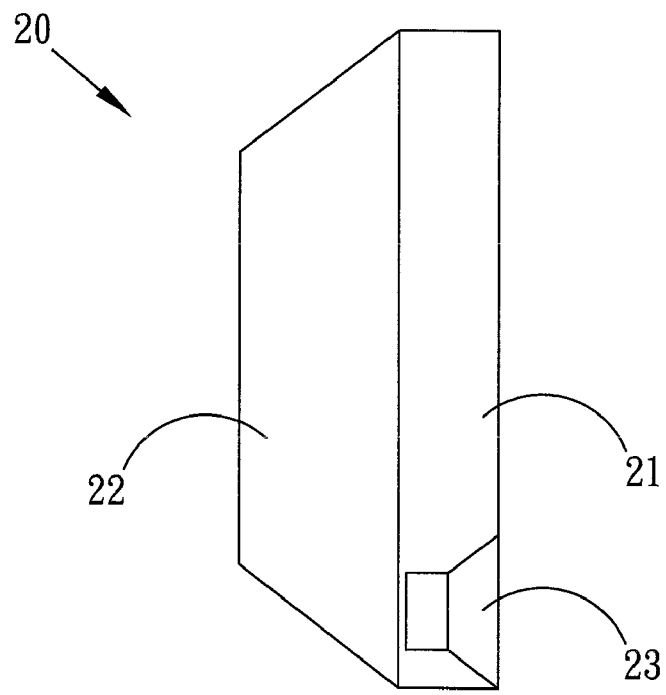
FIG. 1 shows an electronic equipment that at least one speaker is arranged inside the electronic equipment

The following exemplary embodiments take display apparatus as examples, but it should not be limited. FIG. 1 shows an electronic equipment 20 that at least a speaker is arranged inside the electronic equipment. The electronic equipment 20, such as a display apparatus 20, comprises a display panel 21, a backlight, and a pair of speaker 23. If the display apparatus 20 is a Liquid Crystal Display, the display panel 21 will comprise a thin-film transistor substrate, a color filter substrate, and a liquid crystal layer sandwiched between the two substrates. The pair of speakers may be arranged at the left and right sides or the under side of the display panel 21, generally the later arrangement being more popular. The power consumption of one speaker is ranged from 3 watts to 20 watts (for 60 or 70 inches of LCD). The greater is the size of the display apparatus, the greater is the power consumption of the speaker; the greater is the power consumption of the speaker, the greater is the heat generated by the display apparatus. The stability of the display apparatus depends on whether the heat-dissipating efficiency can meet the requirement.

Figure 2:
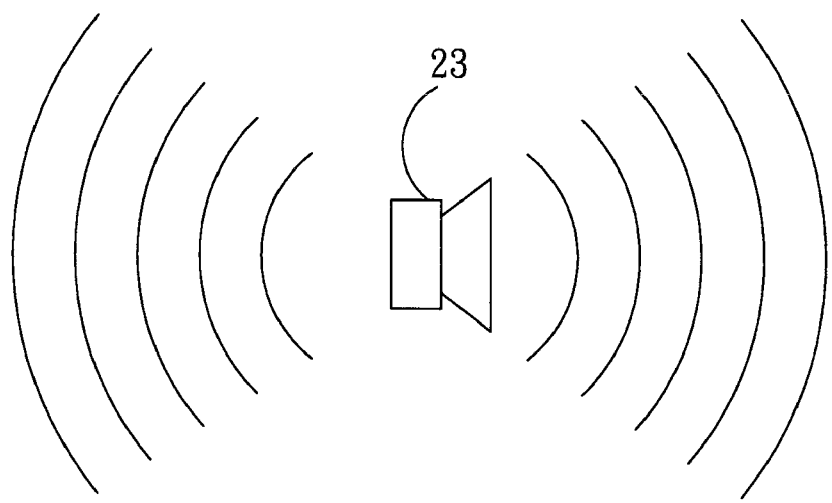
FIG. 2 shows that the energy distribution of the speaker shown in FIG. 1.

FIG. 2 shows that the energy distribution of the speaker 23 shown in FIG. 1. As shown in FIG. 2, when the speaker 23 emits sounds, a portion of the emitted sounds is transmitted in the direction of the front of the speaker, and the other portion of the emitted sounds is transmitted in the direction of the rear of the speaker (i.e., transmitted to the direction of backlight 22) The user cannot hear the sounds transmitted in the direction of the rear of the speaker, that is, the sounds transmitted to the backlight 22 contribute nothing for the user, it being a wasted energy.

Figures 3, 3A:
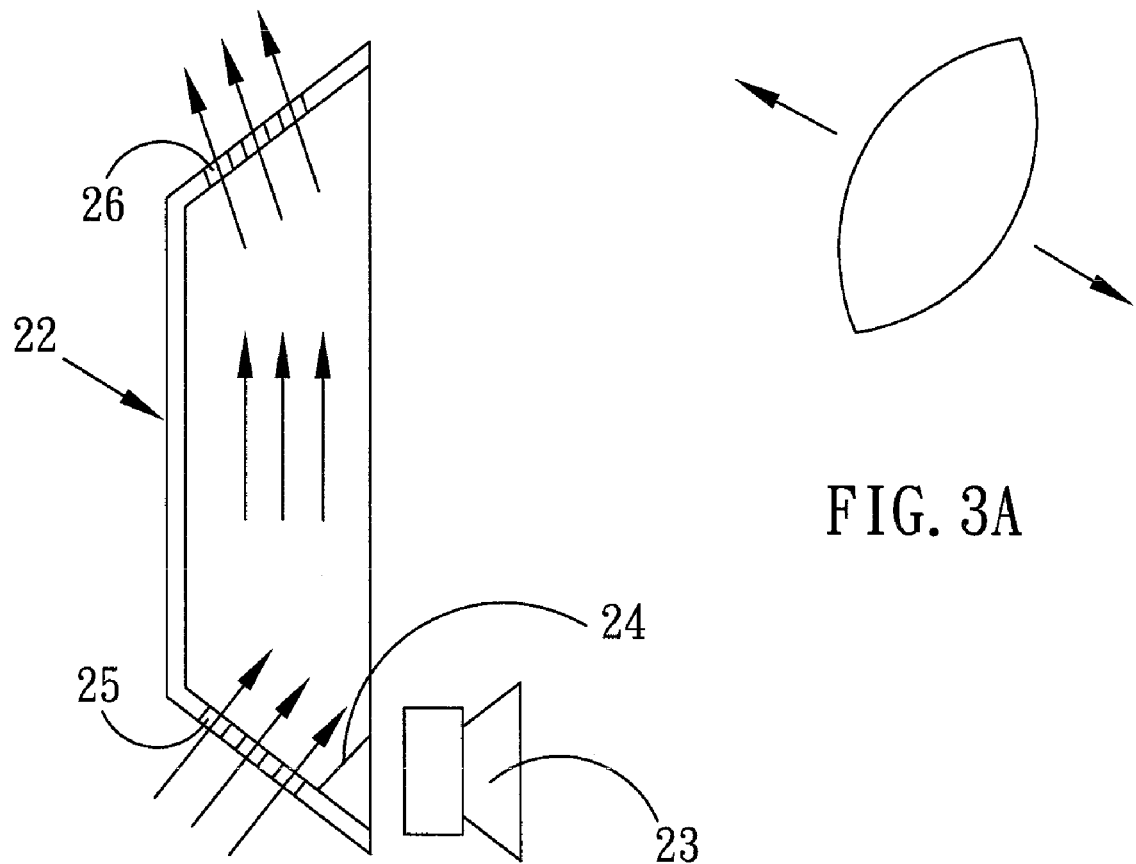
FIG. 3 shows an electronic equipment having a heat-dissipating device according to an embodiment of the present invention.

FIG. 3 shows an electronic equipment having a heat-dissipating device according to an embodiment of the present invention. In this embodiment, the heat-dissipating device is applied to the display apparatus of FIG. 1, but this is not limited. Referring to FIG. 3, at least a vibration component, such as a vibration film 24, is arranged inside the backlight 22 of the display apparatus 20. The backlight 22 can be Direct Type or Edge Type; the major difference of this two type of backlight is the position of the light sources. The vibration film 24 receives the sound energy transmitted to the direction of backlight, causing the vibration film 24 vibrating. The vibration of the vibration film 24 alters the density of the air inside the backlight, causing the air turbulence, and thus the air drives the heat out of the display apparatus. In the preferred embodiment, the backlight 22 comprises one or more (cool) air inlets 25 and one or more (warm) air outlets 26. By assistance of the vibration film 24, the heat convection can be speeded up, and thus the heat transfer efficiency can be increased. The configuration, shape, number, and position of the air inlets and air outlets are not limited. In the preferred embodiment, the elevation of the air outlets is higher than the elevation of the air inlets for increasing the heat transfer efficiency. In addition, the vibration film 24 may be made from a material that can resonate with the speaker 23. In other words, the material of the vibration film 24 depends on the frequency response of the speaker 23. For example, if the speaker 23 has a good frequency response ranged from 20 Hz to 40 KHz, the vibration film 24 may be made from a material that can resonate within the same frequency range. FIG. 3A shows the vibrating of the vibration film 24 shown in FIG. 3.

Figures 4, 4A:
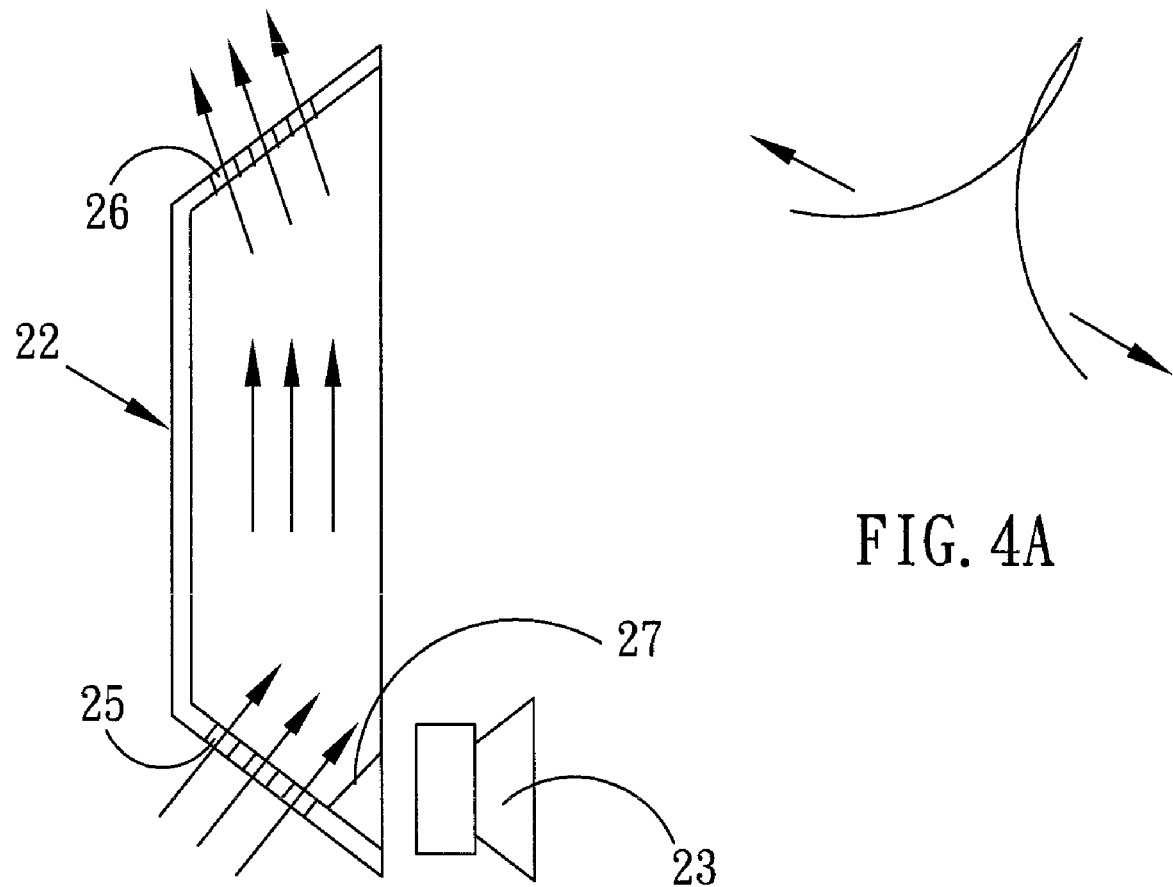
FIG. 4 shows an electronic equipment having a heat-dissipating device according to another embodiment of the present invention.

FIG. 4 shows an electronic equipment having a heat-dissipating device according to another embodiment of the present invention. In this embodiment, the heat-dissipating device is applied to the display apparatus of FIG. 1, but this is not limited. For simplicity, the same reference numerals refer to the same or like components, the description of which are omitted. The embodiment of FIG. 4 differ from the embodiment of FIG. 3 in that a vibration blade 27 replaces the vibration film 24. The principle of the vibration blade 27 is the same as that of the vibration film 24. FIG. 4A shows the vibrating of the vibration blade 27. Compared with FIG. 3A, it is appreciated that the vibrating way of the vibration blade 27 differs from that of the vibration film 24. In addition, the vibration blade 27 may be made from a material that can resonate with the speaker 23. In other words, the material of the vibration film 27 depends on the frequency response of the speaker 23. For example, if the speaker 23 has a good frequency response ranged from 20 Hz to 40 KHz, the vibration blade 27 may be made from a material that can resonate within the same frequency range of the frequency response.

The heat-dissipating device may be applied to an electronic equipment besides the Liquid Crystal Display according to the present invention. In this case, the electronic equipment having the heat-dissipating device comprises a housing, one or more heat sources, one or more the above-mentioned vibration components such as vibration film or vibration blade arranged inside the housing, and at least a speaker. The housing may be made of metal or plastic. The heat source may be any component that generates heat, such as light sources, electronic components, and Central Processing Unit. The vibration film or the vibration blade receives the sound energy emitted by the speaker, causing it vibrating. The housing of the electronic equipment may further comprise the above-mentioned air inlets and air outlets. By assistance of the vibration film or the vibration blade, the heat convection can be accelerated and thus the heat generated by the heat source can be removed quickly.

According to the inventive concept mentioned above, the present invention provides a heat-dissipating method of an electronic equipment, which comprises a housing, at least a heat source generating heat, and at least a speaker. The heat-dissipating method comprises arranging one or more of the above-mentioned vibration film or vibration blade inside the housing, and speeding up the heat convection by altering the air density inside the housing as a result of the vibration of the vibration film or the vibration blade, wherein the vibration film or the vibration blade receives energy transmitted from the speaker and thus causing the vibration.

The present invention has advantages that the electronic equipment is unnecessary to provide electricity power to the vibration film or the vibration blade. The vibration film or the vibration blade employs the wasted sound energy, and works in a physical manner. Hence the electronic system of the electronic equipment will not be complicated, and the energy can be saved and no wasted.

Although specific embodiments have been illustrated and described, it will be appreciated by those skilled in the art that various modifications may be made without departing from the scope of the present invention, which is intended to be limited solely by the appended claims.

What is claimed is:

1. An electronic equipment having a heat-dissipating device, comprising:
   a housing;
   a heat source, generating heat;
   an acoustical speaker generating sound waves suitable for being heard by a user; and
   at least one vibration component arranged inside said housing, wherein said vibration component receives and is driven by a portion of the sound waves emitted by said speaker, causing said vibration component to vibrate, and thereby dissipating heat away from said heat source.

2. The electronic equipment as recited in claim 1, wherein said heat source comprises a light source.

3. The electronic equipment as recited in claim 1, wherein said heat source comprises an electronic component.

4. The electronic equipment as recited in claim 1, wherein said heat source comprises a Central Processing Unit.

5. The electronic equipment as recited in claim 1, wherein said housing further comprises at least one air inlet and at least one air outlet for respectively inputting air and outputting air by assistance of said vibration component.

6. The electronic equipment as recited in claim 5, wherein the elevation of the air outlet is higher than the elevation of the air inlet.

7. The electronic equipment as recited in claim 1, wherein said speaker has a frequency response, and said vibration component is made of a material that resonates with said speaker within the frequency range of the frequency response.

8. A heat-dissipating method of an electronic equipment, said electronic equipment comprising a housing, a heat source generating heat, and at least one acoustical speaker generating sound waves suitable for being heard by a user, said method comprising:
   arranging at least one vibration film or vibration blade inside the housing; and
   dissipating heat by altering the air density inside the housing as a result of the vibration of said vibration film or said vibration blade, wherein said vibration film or said vibration blade receives and is driven by a portion of the sound waves transmitted from said speaker, thus causing the vibration.

9. The heat-dissipating method as recited in claim 8, wherein said housing further comprises at least one air inlet and at least one air outlet for respectively inputting air and outputting air by assistance of said vibration film or said vibration blade.

10. The heat-dissipating method as recited in claim 9, wherein the elevation of the at least one air outlet is higher than the elevation of the at least one air inlet.

11. The heat-dissipating method as recited in claim 8, wherein said heat source comprises light source, electronic component, or Central Processing Unit.

12. The heat-dissipating method as recited in claim 8, wherein said speaker has a frequency response, and said vibration film or said vibration blade is made of a material that resonates with said speaker within the same frequency range of the frequency response.

13. A heat-dissipating device applied to a Liquid Crystal Display comprising:
   a backlight, comprising a plurality of light sources;
   a display panel;
   at least one acoustical speaker generating sound waves suitable for being heard by a user; and
   at least one vibration film or at least one vibration blade arranged inside said backlight, wherein said vibration film or said vibration blade receives and is driven by a portion of the sound waves emitted by said speaker, causing said vibration film or said vibration blade to vibrate, thereby dissipating heat away from the light sources.

14. The heat-dissipating device as recited in claim 13, wherein said backlight further comprises at least one air inlet and at least one air outlet for respectively inputting air and outputting air by assistance of said vibration film or vibration blade.

15. The heat-dissipating device as recited in claim 14, wherein the elevation of the air outlet is higher than the elevation of the air inlet.

16. The heat-dissipating device as recited in claim 13, wherein said speaker has a frequency response, and said vibration film or said vibration blade is made of a material that resonates with said speaker within the same frequency range of the frequency response.

17. The heat-dissipating device as recited in claim 13, wherein said backlight is a Direct Type of backlight.

18. The heat-dissipating device as recited in claim 13, wherein said backlight is an Edge Type of backlight.

19. The heat-dissipating device as recited in claim 13, wherein said vibration film or vibration blade receives the sound waves transmitted from a rear of said speaker.

20. The heat-dissipating device as recited in claim 13, wherein said light sources comprise a plurality of Light Emitting Diodes.

* * * * *